Jan. 22, 1924.
A. W. HUNZ
1,481,423
POWER TRANSMISSION FOR VEHICLES
Filed July 25, 1921 — 4 Sheets-Sheet 2
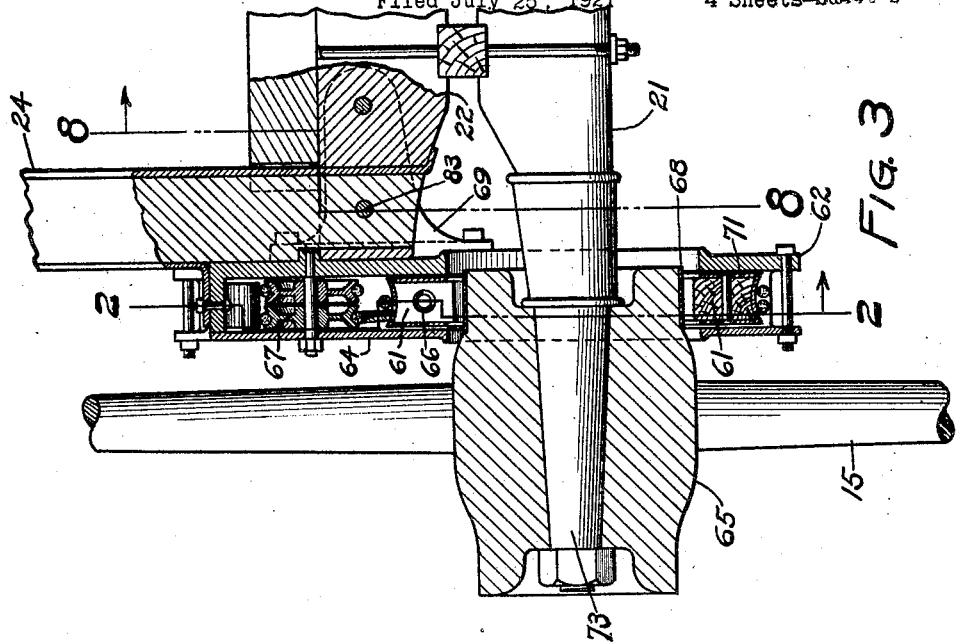
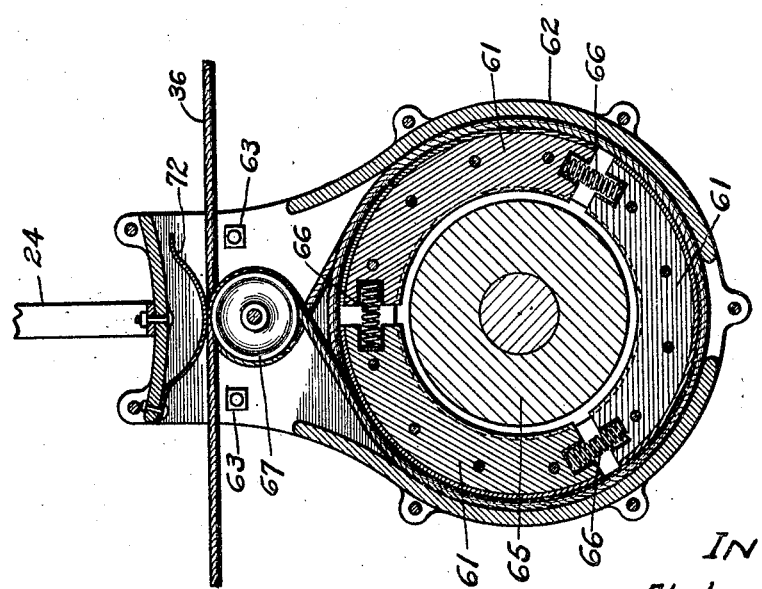
INVENTOR
Alphonse W. Hunz
By Paul & Paul
His Attorneys Jan. 22, 1924.  1,481,423
A. W. HUNZ
POWER TRANSMISSION FOR VEHICLES
Filed July 25, 1921  4 Sheets-Sheet 3
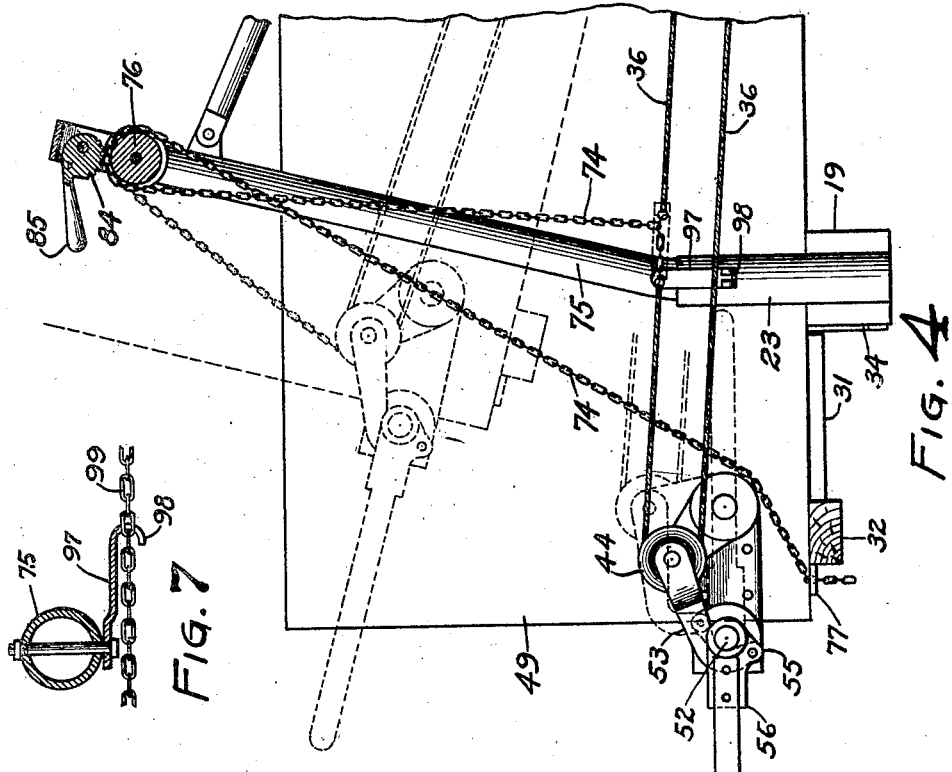
FIG. 4
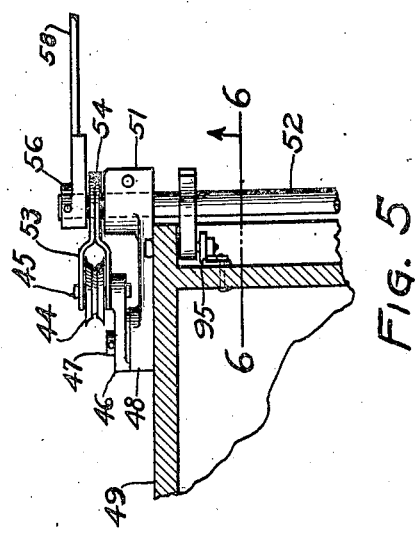
FIG. 7
FIG. 5
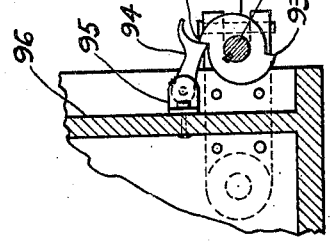
FIG. 6
INVENTOR
Alphonse W. Hunz
By Paul & Paul
His Attorneys Jan. 22, 1924.  1,481,423
A. W. HUNZ
POWER TRANSMISSION FOR VEHICLES
Filed July 25, 1921  4 Sheets-Sheet 4
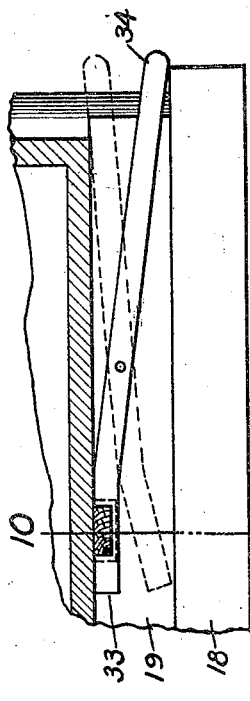
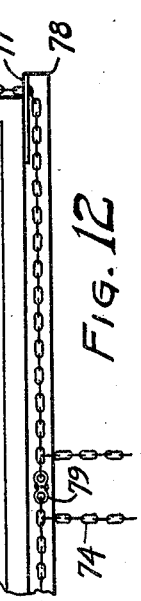
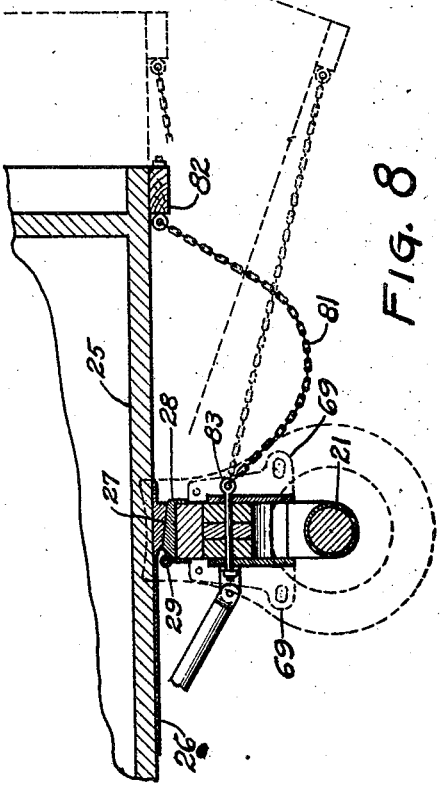
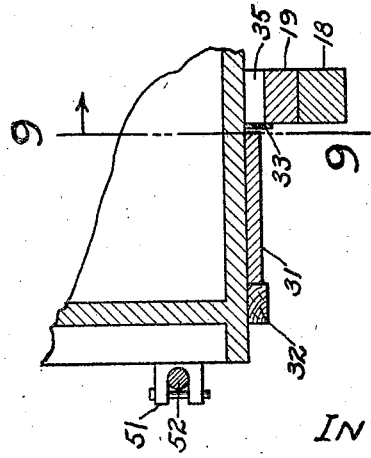
INVENTOR
Alphonse W. Hunz
By Paul & Paul
His Attorneys Patented Jan. 22, 1924.

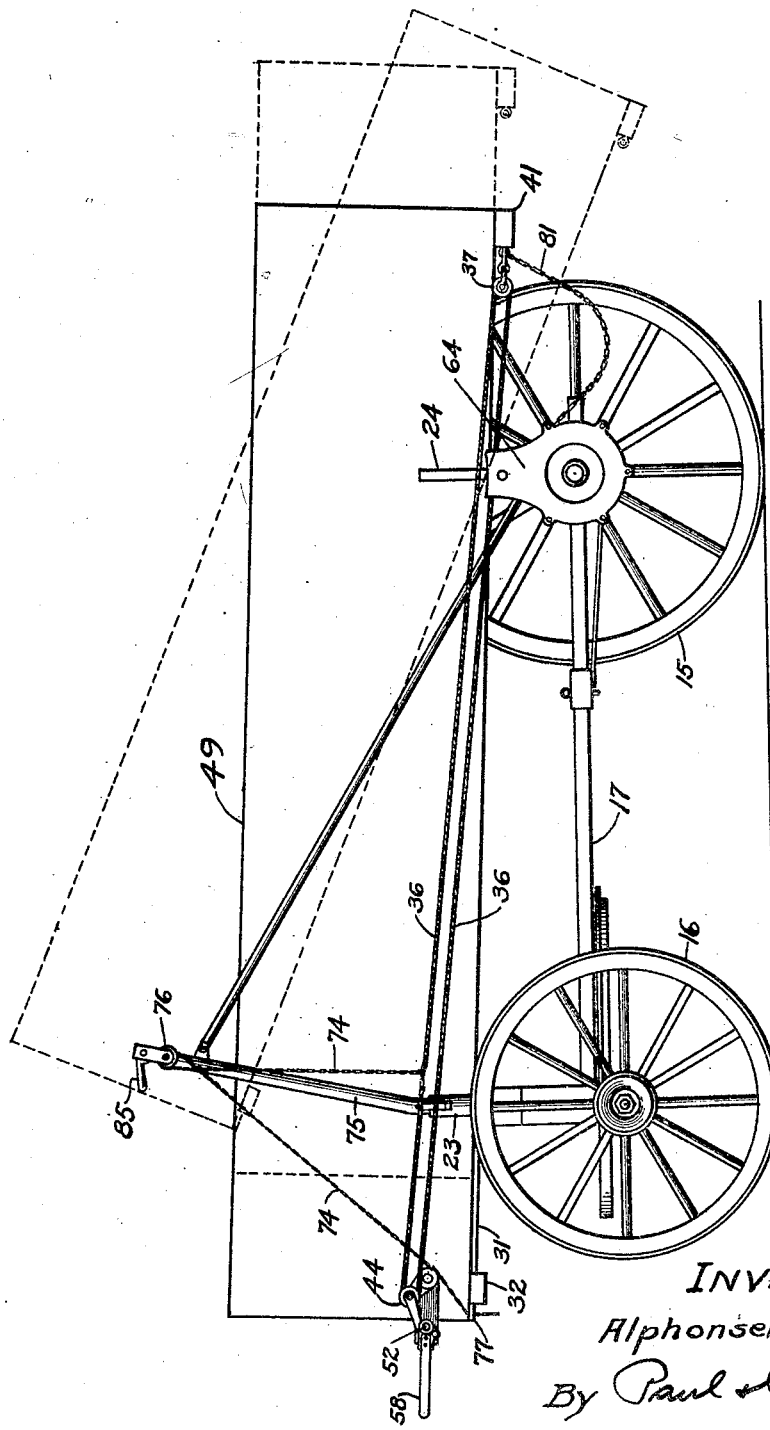

1,481,423

UNITED STATES PATENT OFFICE.

ALPHONSE W. HUNZ, OF CORNELL, WISCONSIN.

POWER TRANSMISSION FOR VEHICLES.

Application filed July 25, 1921. Serial No. 487,339.

*To all whom it may concern:*

Be it known that I, ALPHONSE W. HUNZ, a citizen of the United States, resident of Cornell, county of Chippewa, State of Wisconsin, have invented certain new and useful Improvements in Power Transmission for Vehicles, of which the following is a specification.

This invention relates to new and useful improvements in power transmission for vehicles. It more particularly relates to a means for transmitting power from the wheels of a vehicle in motion and such means is adapted to be used with vehicles where the prime mover be an engine, motor, or draft animals. This mechanism is particularly adapted for use in connection with farm wagons, whereby power is transmitted from the wheels of the moving farm wagon and is presented in a form adapted to a multiplicity of uses. One of such uses is illustrated in the accompanying drawings for purposes of explanation and consists of such power transmission as adapted to hoist or lift the front end of a common type of tiltable wagon box.

The object of the invention is to provide an improved form of power transmission for vehicles.

Other objects of the invention will more fully appear from the following description and the accompanying drawings and will be pointed out in the annexed claims.

In the accompanying drawings there has been disclosed a structure designed to carry out the objects of the invention, but it is to be understood that the invention is not confined to the exact features shown, as various changes may be made within the scope of the claims which follow.

In the drawings:

Figure 1 is a view in side elevation of a common type of box wagon with the invention applied thereto;

Figure 2 is a section through the novel clutch on the line 2—2 of Figure 3;

Figure 3 is a view in vertical section of a positioned clutch and adjacent wagon portions;

Figure 4 is an enlarged fragmentary detail of the hoisting mechanism;

Figure 5 is a fragmentary detail of the clutch operating mechanism;

Figure 6 is a view of the clutch lock, taken in vertical section on the line 6—6 of Figure 5;

Figure 7 is a detail of the forked arm or locking bar for locking the upper portion of the endless flexible member against rearward movement;

Figure 8 is a vertical section on the line 8—8 of Figure 3;

Figure 9 is a vertical section on the line 9—9 of Figure 10;

Figure 10 is a section on the line 10—10 of Figure 9;

Figure 11 is a detail of the yieldable mounting of the rear pulley on the wagon body; and Figure 12 is a detail of the manner of securing the working elements or hoisting chains to the wagon body.

In this selected embodiment of the invention there is shown a power transmission for vehicles which broadly comprises an endless flexible transmission member which is movably mounted upon the vehicle. A clutch is provided so that the transmission member may be selectively actuated during movement of the vehicle. As here shown, the clutch is movable into and out of engagement with one of the rear wheels of the vehicle. A driving connection is provided between the clutch and the transmission member so that the member may be driven upon movement of the vehicle and engagement of the clutch. Further, in the structure here shown, a working element is secured to the member.

The vehicle here shown is a common type of wagon having rear wheels 15, front wheels 16, reach 17, front axle 18 and bolster 19, and rear axle 21 and bolster 22. As is usual, front stakes 23 and rear stakes 24 upwardly project in spaced relation on either side of the wagon. While such a wagon is adapted to any different kinds of bodies mounted thereon, there is here shown a body of the well-known box type.

The box is mounted to rock or tilt on the wagon. The base 25 of the box is provided with a novel plate 26 which extends across and is secured to the end face of the base 25, as shown in Figure 8. The rear transverse portion of this plate is provided with a transversely extending boss 27 which downwardly presents a rearwardly inclined cam surface which normally rests upon a forwardly inclined cam surface which is upwardly presented by a flanged casting 28, secured to and extending across the rear bolster 22. These cooperable cam surfaces are designed to facilitate rearward movement of the box with relation to the wagon. The forward end of the casting 28 is provided with roller bearings 29 which are engaged by the base plate 26 when the box is rearwardly moved. This roller facilitates movement and tilting of the box after disengagement of the two cam surfaces. A novel plate 31 is secured to the under face of the forward portion of the box and to the usual cross bar 32 of the box base. The rearward end of the plate 31 is adapted normally to abut against the detent 33 carried by the lever 34 pivotally mounted on the front bolster 19. This lever 34 is adapted to be manually operated to move the detent 33 from its normal position shown in full lines in Figures 9 and 10, wherein the detent 33 is shown as covering the recess 35 and rearward movement of the box is thereby prevented. Upon such removal of the detent 33 the transverse plate 31 of the box may enter the recess 35 of the front bolster 19 and thus permit rearward movement of the box with relation to the wagon.

The hoisting of the front end of the box is accomplished by power transmitted from the wheels. Preferably the transmission means is in duplicate and provided along each side of the wagon and box. There is provided an endless flexible transmission member such as a cable 36. This cable is mounted upon opposed pulleys. The rear pulley 37 is yieldably secured to the rear end of the box. As is shown in detail in Figure 11, the pulley is rotatably mounted upon a yoke 38 terminally carried by a pin 39 which extends through a spring housing 41 carried by the end face of the box. The rear end of the pin is provided with a head 42 and a spring 43 is carried within the housing and is adapted rearwardly to thrust the head 42. The front pulley 44 is rotatably mounted upon a pin 45 carried by the bracket 46 pivotally mounted on the stud 47 projecting laterally from the casting 48 bolted to the side 49 of the box. This casting forwardly projects and terminally provides a bearing 51 for the shaft 52. This shaft 52 extends across the front of the box and is rotatably borne adjacent the end by the bearings 51 of the mechanisms in duplicate at the sides of the box. A yoke 53 has its two forks secured to the pin 45. The forward portion 54 of the yoke 53 downwardly extends and is mounted on the pivot pin 55 carried by the head 56. This head is pinned to the shaft 52 and is formed with a forwardly projecting recessed portion adapted to receive an operating handle 58 therein. In practice, it is preferable to employ one handle which is inserted in the recessed head at the left front of the box. The purpose of this mounting of the pulley 44 is to maintain the cable in a taut condition or to permit slack in the cable, whereby a clutching mechainsm may be operated.

A clutch is provided at each side of the wagon and each one is adapted to drive one of the cables. The form of clutch shown consists of a plurality of arcuately curved segments 61, which are peripherally grooved. These segments are mounted in a housing 62, suitably secured by bolts 63 to brackets 69 bolted to the adjacent stakes and rear bolsters 22. A cover 64 is bolted to the housing 62. These segments are loosely mounted in the housing and are normally held in radially expanded condition out of contact with the wheel hub 65 by means of the compression springs 66, placed in opposing recesses terminally formed in adjacent segments. The flexible wire cable 36 in its lower portion travels over the grooves in the segments. As shown in detail in Figure 2, the cable is passed about one of the idlers 67, then into the housing and, preferably, twice around the segments, and thereafter upwardly, partially around the inner idler and rearwardly to the pulley 37. Obviously, when the flexible cable is maintained in taut condition, the segments 61 will be radially contracted and their inner surfaces will be held in tight frictional engagement with the usual metallic plate 68, fixedly secured to the periphery of the inner portion of the hub 65 of the wheel. The segments, as shown in Figure 3, are preferably provided with face plates 71 to resist wear.

A leaf spring 72 is terminally bolted to the overhanging flange of the housings 62. This leaf spring downwardly projects and yieldably engages the adjacent portions of the cables in their passage over the two idlers 67. The hub 65, in accordance with the usual practice, is rotatably mounted upon the spindle 73 carried by the rear axle 21. Therefore, when the wagon is forwardly moved by a suitable prime mover, not necessary to be shown, the upper portion of the cable is moved in a forward direction when the clutch is engaged by movement of the handle 58 to the horizontal position shown in Figures 1 and 4.

A working element is connected to the cable. Such working element is here shown as a chain 74 adapted to be used for hoisting purposes. An upright 75 is mounted upon each of the forward bolster stakes 23. These uprights are similar and therefore but one need be described. The upright is rearwardly inclined and is provided adjacent its upper end with a pulley 76 loosely mounted thereon. The chain 74, from its connection with the cable, passes upwardly and rearwardly around the pulley 76 and then extends downwardly and forwardly through an aperture in the angled flange 77 of a bar 78 extending across the front of the wagon box. The two chains 74 are joined together at their front ends. This is preferably effected by means of a common type of repair link 79, so that slack in the chains 74 may be taken up.

It should be noted that the point of connection of the chain 74 with the cable 36 is to the rear of the base of the upright 75.

When the upper portion of the cable 36 is forwardly moved, the chain 74 is pulled by the cable around the pulley 44. This pulley 44, as shown in Figure 5, is provided with a median groove to receive the cable, and a larger groove to receive the chain 74. As the chain is thus pulled, the forward portion of the chain raises the front part of the box to the dotted line position shown in Figure 1. As the upright pulley 76 is rearwardly positioned from the point of connection of the chain to the front of the box, the box is first rearwardly pulled to the position shown in dotted lines in Figure 1, and thereafter is hoisted upwardly to the dotted line position shown in Figure 1. The box is prevented from sliding rearwardly from the rear bolster by means of the detent chains 81, secured to the usual cross bar 82 of the box, and to the pin 83, extending through the rear bolster 22 and bolted in position.

Means are provided for locking the chains 74 when the box is in tilted position. Such locking is simply effected by means of a latch 84 eccentrically mounted in an angle bracket, terminally provided on each upright, and operable by means of the handle 85. The working portion of the latch is suitably toothed or corrugated to engage the adjacent chain portion 74 and hold the same against movement.

The clutch operating mechanism is also adapted to be held against accidental release. In the position of the mechanism shown in Figure 4, the tension on the pulley 44 exerted by the cable 36 is in a rearward direction. The mechanism for taking up and creating slack in the cable 36, whereby the clutch is operated, is maintained in a selected set position due to the toggle-like arrangement of the parts. When the pivot pin 55 is moved to the position shown in Figure 4, by movement of the handle 58, the pin passes through the line of centers of the pulley 44 and the shaft 52 and the curved portion of the yoke 53 abuts against the shaft and is thereby held against farther movement. As a further means of locking the parts in the desired position, a ratchet 91 is keyed to the shaft 52. Teeth 92 and 93 are provided on the ratchet and are adapted to be singly engaged by a dog 94 pivotally mounted on a bracket 95 bolted to the front end 96 of the box. The dog may thus prevent rotation of the shaft. As the head 56 is pinned to the shaft, movement of the head is prevented by the dog and ratchet. The dog and ratchet device is preferably not provided in duplicate at each front side of the box as a single one is sufficient.

When it is desired to lower the box from its tilted dumping position shown in Figure 1, the eccentric locks on the tops of the two uprights are released, the dog 94 is disengaged and the handle 58 is upwardly moved so that the cable 36 is slackened. Gravitational force functions to drop the box to the wagon. The wagon must then be rearwardly moved in order to effect forward movement of the box with relation to the wagon so that the box may return to normal position on the wagon bolsters. To this end a locking bar 97 is pivotally mounted on the upright and adapted to assume the horizontal locking position shown in Figure 7 wherein a terminal forked hook 98 of the locking bar through which pass the links 99 of the chain section employed to connect the ends of the cable 36. When the handle 58 is thrown into clutch-engaging position and the wagon is backed, the cable 36 is prevented from movement, with the result that the box is drawn to forward normal position with respect to wheels 15 and 16. The clutch is thereafter disengaged and the lever 34 is moved to bring the detent 33 to the position shown in Figure 10 whereby the box is thereafter held against rearward movement.

I claim as my invention:

1. In a power transmission for vehicles, the combination of an endless flexible transmission member movably mounted on the vehicle, a clutch movable into and out of engagement with a wheel of said vehicle, said clutch being adapted to drive said member when in engagement with said wheel, and said member used as means to engage and disengage the clutch whereby upon movement of the vehicle and engagement of the clutch, said transmission member is rotated.

2. In a power transmission for vehicles, the combination of an endless flexible transmission member movably mounted on the vehicle, a clutch movable into and out of engagement with a wheel of said vehicle, said clutch being adapted to drive said member when in engagement with said wheel, and said member used as means to engage and disengage the clutch whereby upon movement of the vehicle and engagement of the clutch, said transmission member is driven, and a working element secured to the member.

3. In a power transmission for vehicles, the combination of an endless flexible transmission member rotatably mounted on the vehicle, a rotatable clutch movable into and out of engagement with a wheel of the vehicle, said clutch being adapted to have the member pass around the same, and means operable selectively to maintain the member in taut position whereby the clutch is maintained in engaged position and the member thereby rotated upon movement of the vehicle.

4. In a power transmission for vehicles, the combination of a pair of endless flexible members mounted to travel on opposed sides of the vehicle, a clutch movably mounted on each side of the vehicle adjacent a wheel and respectively movable into and out of engagement with the same, said clutches being adapted each to drive one of said members when in engagement with a wheel, and said transmission member used as means to engage and disengage the clutches whereby upon movement of the vehicle and engagement of the clutches, said transmission members are driven, and a pair of working elements, each element having one end secured to a transmission member and the other ends thereof being connected together for cooperative working movement upon movement of the flexible members.

5. In a power transmission for vehicles, the combination of an endless flexible transmission member movably mounted on the vehicle, a clutch movable into and out of engagement with a wheel of the vehicle, said clutch being adapted to drive said member when in engagement with the wheel, means to engage and disengage the clutch whereby upon movement of the vehicle and engagement of the clutch said transmission member is driven, an upright secured to the vehicle, a pulley rotatably mounted adjacent the upper end of the upright, and a working element secured at one end to said flexible member and extending over said upright pulley whereby the working element may be used for hoisting purposes upon actuation of the flexible member.

6. In a power transmission for vehicles, the combination of an endless flexible transmission member movably mounted on the vehicle, a clutch movable into and out of engagement with a wheel of the vehicle, said clutch being adapted to drive said member when in engagement with the wheel, means to engage and disengage the clutch whereby upon movement of the vehicle and engagement of the clutch said transmission member is driven, an upright secured to the vehicle, a pulley rotatably mounted adjacent the upper end of the upright, a working element secured at one end to said flexible member and extending over said upright pulley whereby the working element may be used for hoisting purposes upon actuation of the flexible member, and means on the upright for locking said element against movement.

7. In a dumping mechanism for wagons having tiltable bodies, the combination of pulleys secured in complementary pairs to opposed sides of the wagon body, a pair of endless flexible members, each mounted to travel over one of said complementary pairs of pulleys, a clutch mounted on each side of the wagon and movable into and out of engagement with the adjacent wagon wheel, each clutch being adapted when in engagement with a wheel to drive one of said members, means to engage and disengage each clutch whereby, upon movement of the vehicle and engagement of the clutches, said flexible members are driven, uprights mounted on opposed sides of the wagon, a pulley adjacent the upper end of each upright, and a pair of flexible working elements, each element having one end secured to one of the flexible members and extending upwardly over an upright pulley, the other ends of said elements being connected to the front end of the wagon body, whereby upon engagement of the clutches, during movement of the wagon, the wagon body is tilted by said element and any contents are rearwardly dumped.

8. In a power transmission for vehicles, the combination of an endless flexible transmission member movably mounted on the vehicle, a clutch housing mounted on the vehicle and substantially surrounding a wheel hub, a plurality of complementary arcuate segments in said housing, each segment being exteriorly grooved whereby the flexible member may extend in said grooves around the segments, means yieldably to hold said segments in radially expanded position whereby upon maintenance of the member in taut condition, the segments are contracted to engage the wheel hub and thereby drive the flexible member upon movemnt of the vehicle, and means for selectively maintaining the member in taut condition.

9. In a transmission means, the combination of an endless flexible member suitably mounted for movement, a rotatable instrumentality, a clutch housing substantially surrounding said instrumentality, a plurality of complementary arcuate segments in said housing, said segments being peripherally grooved and adapted to have the endless member pass there-around, means yieldably to maintain the segments in radially expanded position, whereby upon maintenance of the member in taut condition, the segments are contracted to engage the instrumentality and be thereby simultaneously rotated to drive the member, and means for maintaining the member in taut position.

10. In a dumping mechanism for wagons having tiltable bodies, the combination of pulleys arranged in complementary pairs on each side of the body adjacent the front and rear thereof, a pair of endless flexible members, each disposed to travel over one pair of complementary pulleys, a pair of clutches mounted on the wagon and respectively operable to engage and disengage each rear wheel, said endless members each having driving connection with a clutch whereby upon forward movement of the wagon and engagement of the clutch the members may be driven, means to operate the clutches, uprights mounted upon opposite sides of the wagon and inclined toward the rear of the wagon, a pulley adjacent the upper end of each upright, and a pair of flexible working elements, each element having one end secured to one of the flexible members at that portion which is adapted forwardly to travel upon forward movement of the wagon, each element extending therefrom upwardly over an upright pulley, and connected to the body at the front end thereof, the point of securing of each element to its member being normally to the rear of the base of the upright whereby, upon forward travel of the wagon, the body is first rearwardly moved with relation to the wagon and thereafter tilted rearwardly to dump the body contents.

11. In a dumping mechanism for wagons having tiltable bodies, the combination of pulleys arranged in complementary pairs on each side of the body adjacent the front and rear thereof, a pair of endless flexible members, each disposed to travel over one pair of complementary pulleys, a pair of clutches mounted on the wagon and respectively operable to engage and disengage each rear wheel, said endless members each having driving connection with a clutch whereby upon forward movement of the wagon and engagement of a clutch the members may be driven, means to operate the clutches, uprights mounted upon opposite sides of the wagon and inclined toward the rear of the wagon, a pulley adjacent the upper end of each upright, a pair of flexible working elements, each element having one end secured to one of the flexible members at that portion which is adapted forwardly to travel upon forward movement of the wagon, each element extending therefrom upwardly over an upright pulley and connected to the body at the front end thereof, the point of securing of each element to its member being normally to the rear of the base of the upright whereby, upon forward travel of the wagon, the body is first rearwardly moved with relation to the wagon and thereafter tilted rearwardly to dump the body contents, and locking means on the wagon adapted to hold a portion of each member against movement, whereby when a portion of each member is so held and the wagon is rearwardly moved, the body is forwardly moved.

In witness whereof, I have hereunto set my hand this 19th day of July, 1921.

ALPHONSE W. HUNZ.